July 30, 1935. C. H. WILD 2,009,828

PROCESS OF OPENING CASES FROM THE FLAT, AND APPARATUS THEREFOR

Filed July 26, 1933 10 Sheets-Sheet 1

*Fig. 1*

INVENTOR.
Charles H. Wild
BY
William W. Varney
ATTORNEY.

July 30, 1935.   C. H. WILD   2,009,828
PROCESS OF OPENING CASES FROM THE FLAT, AND APPARATUS THEREFOR
Filed July 26, 1933   10 Sheets-Sheet 5

INVENTOR.
Charles H. Wild
BY
William W. Carney
ATTORNEY.

Fig. 7

July 30, 1935. C. H. WILD 2,009,828
PROCESS OF OPENING CASES FROM THE FLAT, AND APPARATUS THEREFOR
Filed July 26, 1933 10 Sheets-Sheet 7

Fig. 8

INVENTOR.
Charles H. Wild
BY
William W. Varney
ATTORNEY.

July 30, 1935. C. H. WILD 2,009,828
PROCESS OF OPENING CASES FROM THE FLAT, AND APPARATUS THEREFOR
Filed July 26, 1933 10 Sheets-Sheet 10

INVENTOR.
Charles H. Wild
BY
William W. Varney
ATTORNEY.

Patented July 30, 1935

2,009,828

UNITED STATES PATENT OFFICE 2,009,828

PROCESS OF OPENING CASES FROM THE FLAT, AND APPARATUS THEREFOR

Charles H. Wild, Baltimore, Md., assignor to Burt Machine Company, Incorporated, Baltimore, Md., a corporation of Maryland Application July 26, 1933, Serial No. 682,315

3 Claims. (Cl. 93—53)

The object of my invention is an improved process for opening cases from the flat.

A further object of my invention is the process of squaring a carton from a flat position thereof.

A further object of my invention is the providing of an automatic means for opening cases or cartons.

A further object of my invention is the providing of means for automatically squaring and truing the case after opening.

A further object of my invention is the maintaining of the case in its open and squared position until finally passed and discharged from the machine.

A further object of my invention is the providing of means to relieve the pressure of supply from acting upon an individual case to be operated upon in its delivery into the machine.

A further object of my invention is the providing of means for feeding cartons in limited quantities from a continuous pile or mass of cartons to a machine.

A further object of my invention is the control and predetermined limiting of the feeding of cartons to a machine.

With the foregoing and other objects in view, my invention consists of the methods employed, combination and arrangement of systems, apparatus and means as hereinafter specifically set forth, provided and illustrated in the accompanying drawings wherein is shown the preferred embodiment of my invention, but it is understood that changes, variations and modifications may be resorted to which come within the scope of the claims hereunto appended.

General description

A carton on which the machine as designed is to operate is oblong and rectangular, and includes two relatively wide side walls, called the major walls, two narrower edge walls, called the minor walls, extensions on the minor edge walls and extensions on the major walls from which end walls are formed. The carton is supplied to the machine in a collapsed or flattened condition, all its parts being arranged in two parallel layers, each including one major wall and its end extensions, and one minor wall and its extensions, the collapsed cartons being arranged side by side in a column which is fed to the machine in the hopper from which the collapsed boxes are detached one at a time, means being provided to govern the cartons in the hopper to prevent excessive weight and pressure on the carton being detached.

It will be noticed that the cartons folded as above have slits at the ends corresponding to the fold between the major and minor walls to a depth of the extensions for end walls. These slits, when the carton is in flattened condition, do not register, the major wall extension protruding over the minor wall extension, whereby the lifting of the extension on the major wall opens the major wall extension from its opposite major wall extension, whereby a separating device may be inserted: Upon the insertion of the separating device, as hereinafter described, the carton is partially opened and the finishing of the process of squaring is then done exteriorly, as will appear later. In other words, we take a card-board carton and press down one extension near the cut and raise up the other extension near the other cut, then insert the arm between the two cuts and partially open the carton holding down the bottom major wall, raising up the other major wall with the two levers until it is up against the stop and back of the lock levers, as will be learned from the description to follow.

In these specifications and claims, when I use the term "carton", I mean a collapsible container of any character or material, including paper, having creased or bent edges, and metal with hinged edges.

Drawings

In the drawings submitted with this case, I have shown an improved apparatus for performing the process claimed herein, and concerning which machine claims are made.

Similar numerals refer to similar parts throughout the several views.

Primarily, there are two travelling belts provided with various stops travelling in timed relation with reference to each other. These belts are designated as 1, the upper locking belt, 2 the lower conveying belt. These two belts are preferably of the chain type to provide positive movement, and operate over positively driven sprocket wheels, the various sprocket wheels being driven preferably by sprocket chains to insure accurate timing.

Belt drives

Figure 1:
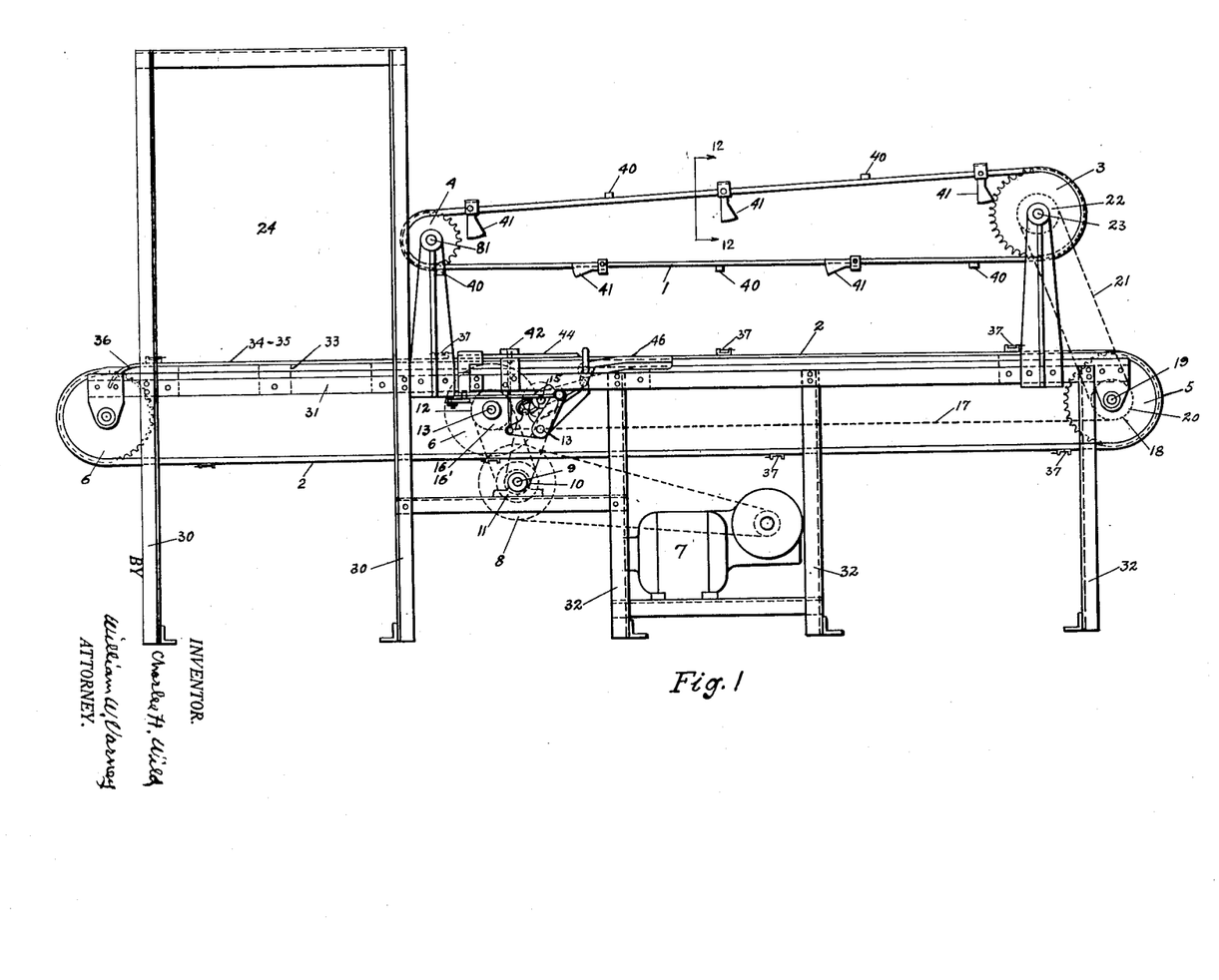
Figure 1 is a side view in elevation of my improved apparatus for opening cases without any cartons being positioned, and shows an outline of the entire machine in elevation without the various controls being shown.

Upper locking belt 1 operates over sprocket wheels 3 and 4; lower conveying belt 2 operates over sprocket wheels 5 and 6. 7 is the driving means, in the case shown in Fig. 1, an electric motor, which by means of reducing gears drives sprocket wheel 8 on shaft 9 driving the same. Shaft 9 is, I might say, a countershaft for speed reduction and has thereon sprockets 10 and 11 which are driven thereby. Sprocket 10, by means of sprocket chain drives sprocket 12 on clutch shaft 13, driving the same when the clutch is engaged. Sprocket wheel 11 drives sprocket wheel 16 secured to cam shaft 15, which shaft revolves continuously; as shown in the drawings, cam shaft 15 revolves about half as fast as clutch shaft 13 which works intermittently by means of clutch 14, clutch 14 being of the punch press type.

Sprocket wheel 16¹ on clutch shaft 13 drives sprocket wheel 18 by means of chain belt 17, sprocket 18 being on shaft 19 driving lower conveyor belt 2 by means of sprocket wheel 5 secured to shaft 19 (see Fig. 1). Sprocket 20 is secured to shaft 19 and drives sprocket 22 on shaft 23 by sprocket chain 21, shaft 23 driving upper locking belt 1 by means of sprocket wheel 3 secured to said shaft 23.

Lower conveyer belt 2

Lower conveyer belt 2 passes through the chute or hopper 24 in which are piled the cartons or cases to be opened.

Figure 7:
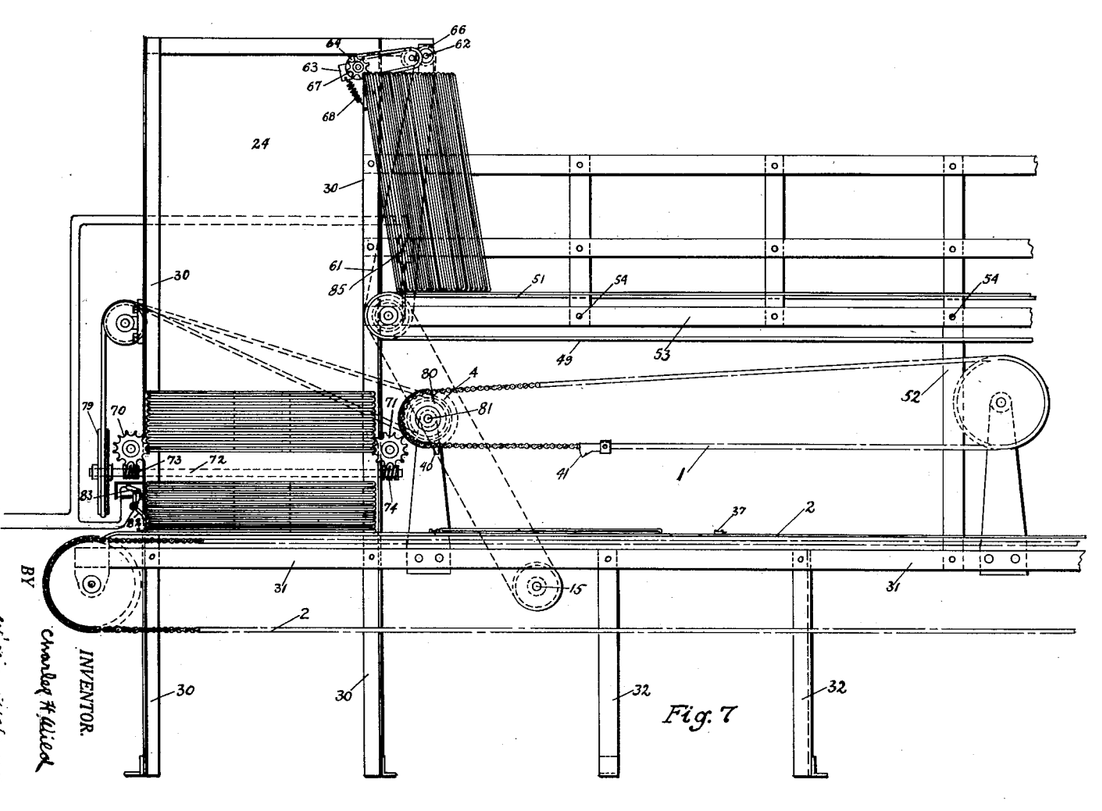
Fig. 7 is a side view in elevation of a part of the machine shown in Fig. 1, with the feeding control added.
Figure 8:
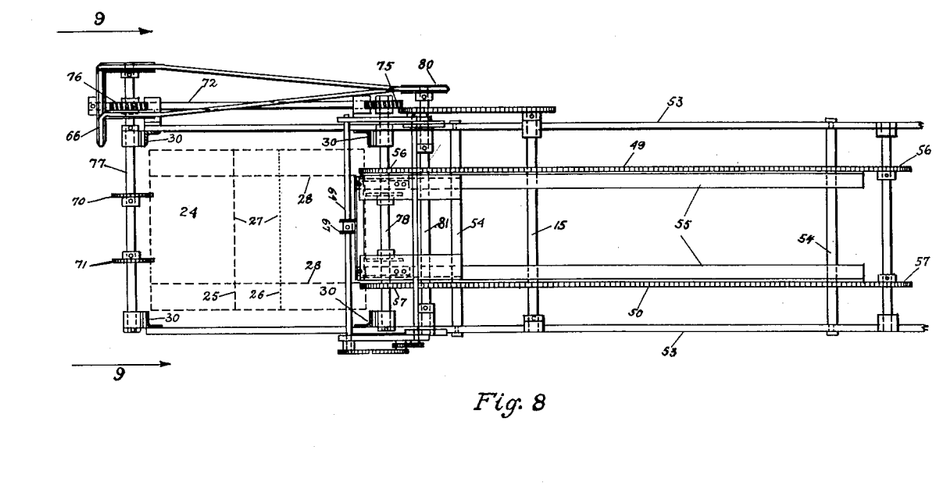
Fig. 8 is a partial plan view of the apparatus shown in Fig. 7.

Hopper 24 is shown in the drawings (Fig. 1) without the regulating device and in Fig. 7 with the regulating device. I will now describe the hopper as exhibited in Fig. 7. Figure 8 is a plan view of the hopper shown in Fig. 7; in Fig. 8 is shown, in dot, the outline of a carton to be fed, showing the relative position of the extensions on the major and minor walls, the dash cut 25 being on top and the dot cut 26 being underneath. The creases 27 of major and minor wall adjoining being also shown, one in dash and the other in dot as they are aligned with the cuts; likewise, creases 28 are shown involving the extensions. The hopper in Fig. 7 is the hopper in which the automatic feeding takes place, and consists principally of angle iron 30 without side walls. These angle irons 30 are extended downward, forming legs for the machine, and are secured to side bars 31 and also to side bars 53.

Figure 2:
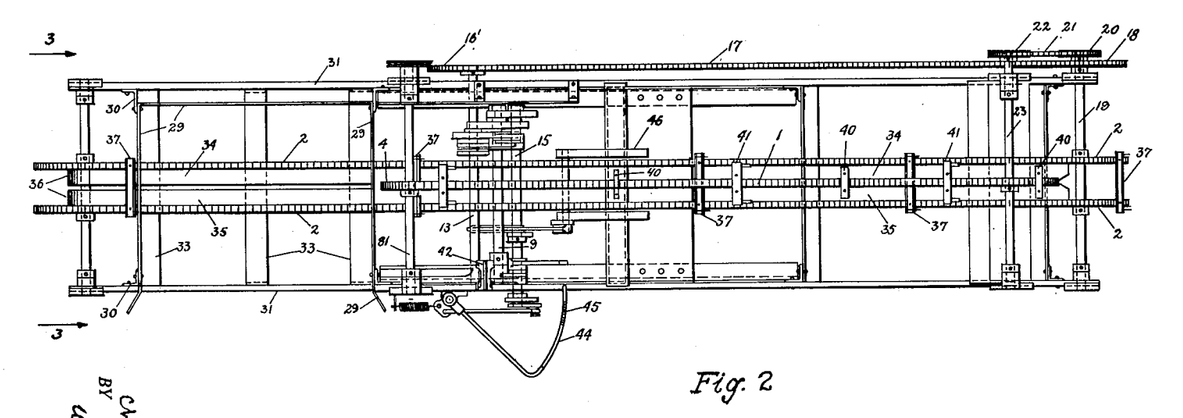
Fig. 2 is a plan view of the apparatus shown in Fig. 1.
Figure 3:
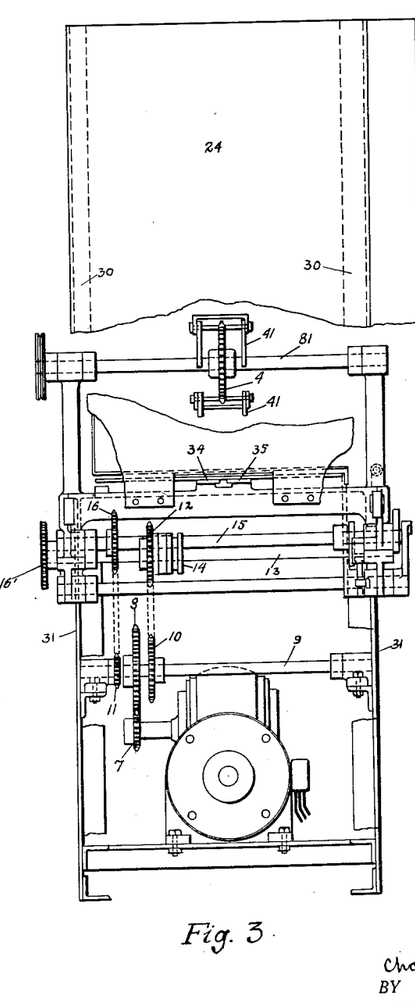
Fig. 3 is an end view in elevation of the apparatus shown in Figs. 1 and 2.
Figure 4:
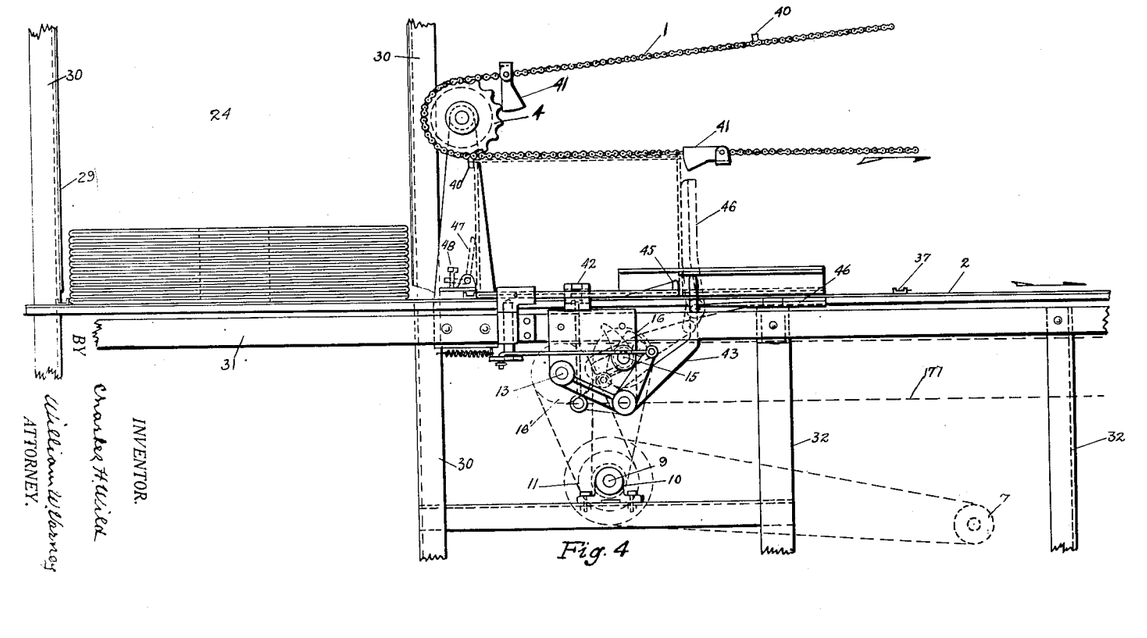
Fig. 4 is a view in elevation somewhat similar to that shown in Fig. 1, with a stack of cartons without the control mechanism being shown.
Figure 5:
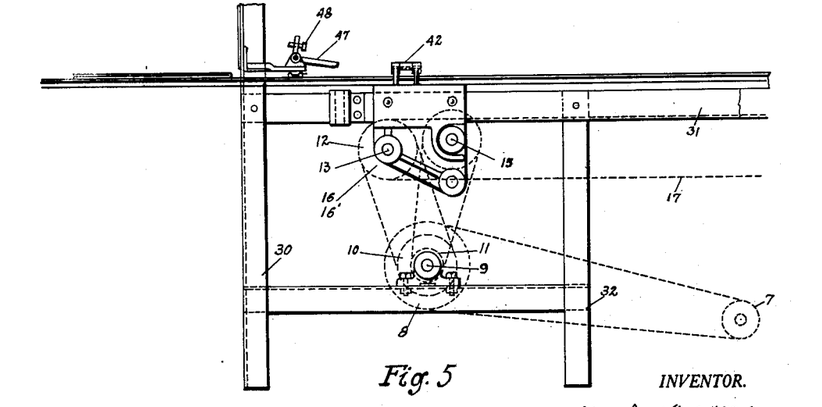
Fig. 5 is a detail of the hold-back and hold-down mechanism controlling the entering edge of the carton.
Figure 6:
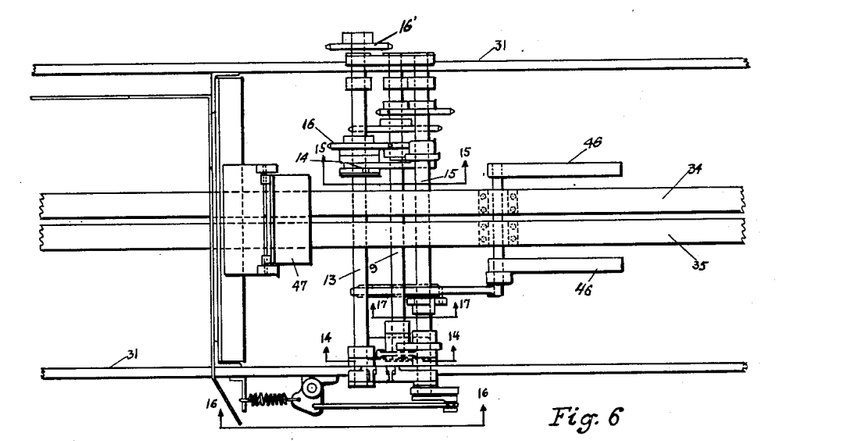
Fig. 6 being a plan view of the device shown in Fig. 5.

In Fig. 1, where the machine is fed by hand, the front angle irons are reversed to permit the cartons to be introduced from the front, as shown in Figs. 1 and 2, and are provided with metal side walls 29 which are flared on the front face to facilitate feeding. These angle irons are spaced far enough apart to permit the cartons to pass easily between them.

31 are side bars, one on each side of the machine, running parallel with the conveyer belt, forming an element of the frame; these bars are secured to angle iron 30 and legs 32.

33 are crossbars at the bottom of hopper 24, which bars are secured to side bars 31 at their ends and carry longitudinal supporting members 34 and 35. Longitudinal supporting members 34 and 35 form the bottom or elements upon which the cartons rest in the magazine, and said supporting members extend practically from one end of the machine to the other, and are curved at their ends as shown in Fig. 1, which I will designate as 36. These supporting members are sufficiently spaced apart in the horizontal to permit contacting studs 39 secured to conveyer bar 37 to pass between and slide below the same, the cartons in their progress through the machine sliding on these plates.

Figure 10:
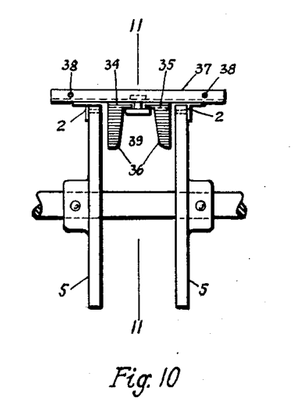
Fig. 10 is an enlarged view of the carrier bar in its assembly with the longitudinal supporting members, Fig. 11 being a view taken through 11—11 of Fig. 10.
Figure 11:
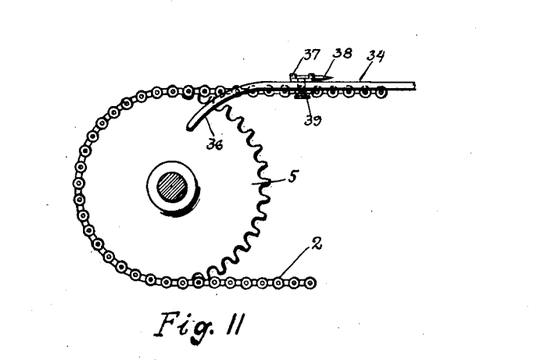
Figure 12:
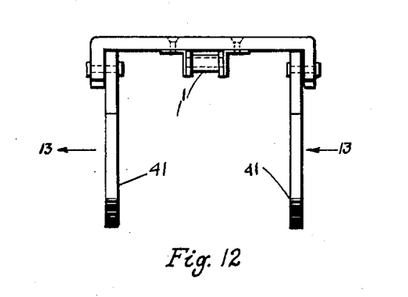
Fig. 12 is an enlarged view taken through chain 40 at 12—12, of Fig. 1 looking in the direction of the arrows.
Figure 13:
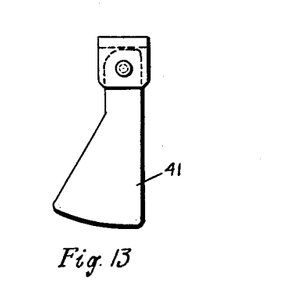
Fig. 13 is an enlarged view at right angles to the view shown in Fig. 12, looking in the direction of the arrows.
Figure 14:
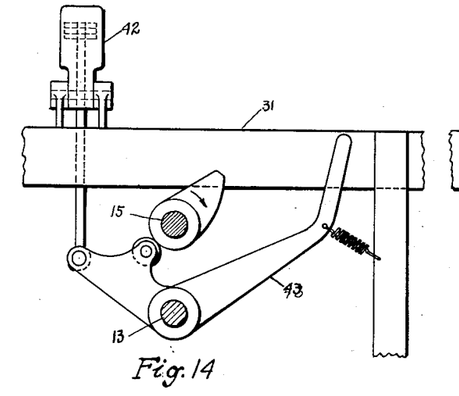
Fig. 14 is an enlarged sectional view in elevation of the cam and rocker-arm controlling the depressor 42, taken through 14—14 of Fig. 6, looking in the direction of the arrows.
Figure 15:
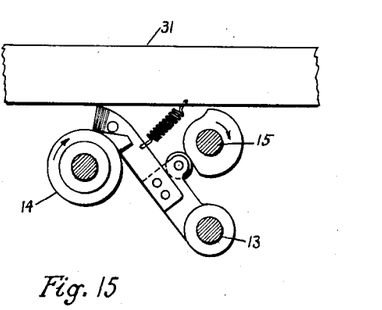
Fig. 15 is the control for clutch 14 and is a sectional view in elevation taken through 15—15 of Fig. 6, looking in the direction of the arrows.
Figures 16, 17:
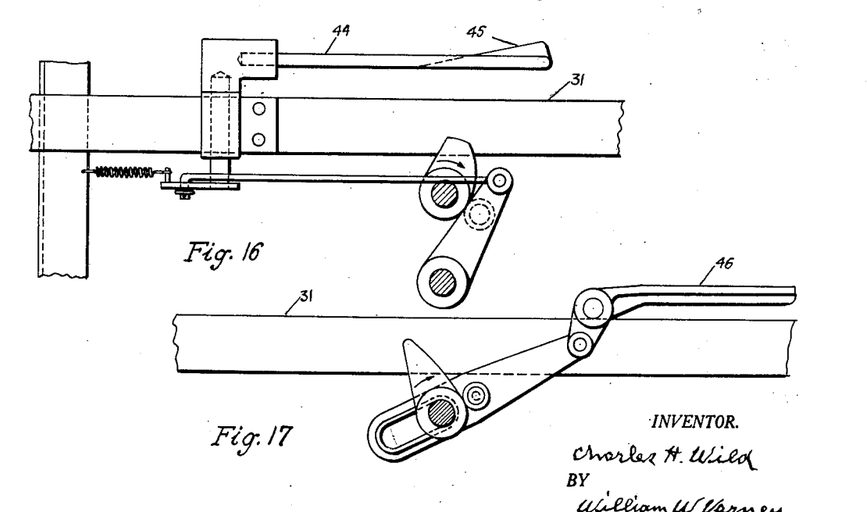
Fig. 16 is an enlarged view in elevation showing the operating mechanism for opener 44, and is looking in the direction of the arrows 16—16 of Fig. 6.
Fig. 17 is an enlarged sectional view in elevation, taken through 17—17 of Fig. 6, particularly showing the mechanism for operating opening members 46.

On lower conveyer belt 2 are positioned conveyer bars 37 at a distance exceeding the collapsed width of the carton to be fed, a carton being fed between each series of bars. One end of these bars is secured to one of the conveyer belts on one side of longitudinal supporting members 34, and the other end is secured to the other lower conveying belt 2, the securing being preferably by means of extension to conveyer bar registering with a link of the conveyer belt (see Fig. 10). These conveyer bars are preferably made of channel iron, bosom up, edges chamferred outward (see Fig. 11), and provided with securing needles 38. To prevent conveyer bar 37 from changing its relative position with reference to supporting member 34, contacting stud member 39 is used which protrudes through the opening between supporting members 34 and 35, and is provided with a head underneath the same, thereby forming a sliding member thereunder. Conveyer belts 2 travel intermittently and are controlled by clutch 14, which will be described later.

Upper locking belt 1

Upper locking belt 1 is provided with fixed spacing bar 40 secured to a link of the chain, and locking dog 41, which is pivotally mounted to said chain properly spaced from the spacing bar to accommodate the size of the carton operated upon.

42 is an initial depressor for depressing an extension on a major side wall, and 46 is an external squaring means for squaring the case after it has been pried open.

47 is a backing plate which, upon the squaring of the carton, is elevated into an adjustable position by means of adjusting screw 48.

Hopper control

Figure 9:
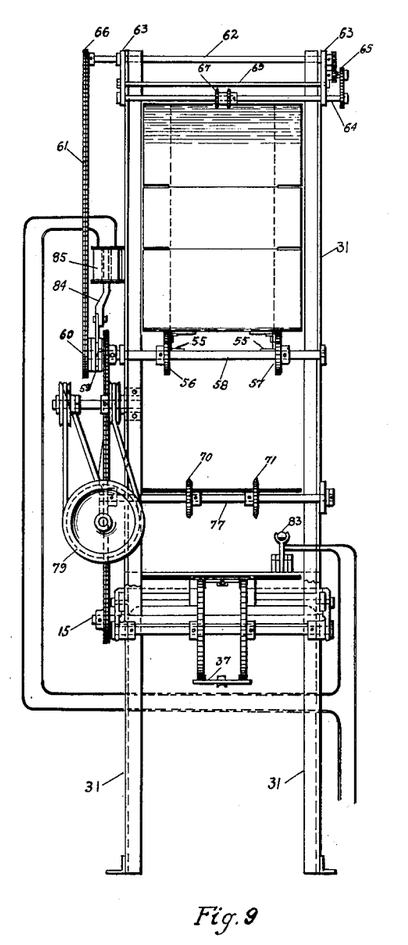
Fig. 9 being a partial end view in elevation of the apparatus shown in Figs. 7 and 8.

Referring particularly to Figs. 7, 8 and 9, where an automatic feeding of the machine is provided, 49 and 50 are hopper conveying belts which are mounted to ride on a track 51. The frame-work carrying these chain belts consists as follows:

Starting with the legs of the machine, 30 and 32, and their attached side bar 31, 52 is an upright carrying the upper horizontal supports in conjunction with angle iron corner 30 by means of side bars 53. The side bars 53 are spaced apart by spacing members 54 which carry the track 51 upon which the hopper conveying belt rides. The securing of track 51 to members 55 is such that the links of the chain are a sufficient space above said members 55 to feed and convey the cartons; members 55 are secured to spacing members 54. Hopper conveying belt 49 is carried by sprocket wheels 56 and 57, and is driven from shaft 15 by a belt operating continuously through a clutch member 59 on shaft 58, the clutch 59 operating intermittently to control hopper conveying belt 49, by means hereinafter described. This clutch is of the punch press type. Driven by shaft 58 by means of a sprocket 60 and sprocket chain 61, is shaft 62, on which shaft 62 are links 63 to carry shaft 64. Shaft 64 is driven by sprocket 65 from sprocket 66 on shaft 62. On shaft 64 are star wheels 67 feeding the top of the carton and timed peripherally to correspond with the peripheral speed of conveyer belt 49 and operate synchronously therewith. The links 63 permit free movement in the vertical of star wheel 67, so that the same may bear against the top edges of the pile of cartons, assisted by means of spring 68 to a limited downward movement controlled by bar 69.

Control of hopper belt 49 and feeding

In hopper 24 (see Fig. 7) are feeding star wheels 70 and 71, two on each side of the hopper, as shown in Fig. 8. These wheels have teeth of sufficient width to engage one carton each, and protrude into the hopper sufficiently to carry the load of cartons above the star wheels. These star wheels work in timed relation with each other and are controlled by means hereinafter described. 72 is a shaft operating worms 73 and 74 operating worm wheels 75 and 76, which worm wheels are mounted on shafts 77 and 78, upon which shafts are also mounted star wheels 70 and 71. On shaft 72 is pulley 79, which pulley is operated by means of a belt from pulley 80, pulley 80 being secured on shaft 81 upon which shaft is secured sprocket wheel 4.

Electric control of hoppers 82 is an electric switch arm controlling mercury tube switch 83 whereby the arm, when pressed out in open position bearing against the carton, opens the switch or breaks the current, and when the cartons become depleted permits the arm to swing into the carton space, and the switch is closed making electric contact. This switch controls the operation of clutch mechanism 59 by means of a solenoid-operated punch arm 84 operated by solenoid 85.

When feeding from the horizontal stack with the cartons on edge by means of the traveller belt 49 and star wheel 67, the operation of which is controlled by the clutch mechanism 59, star wheel control 70 and 71 may be dispensed with.

Operation of the invention

A pile of cartons being in the hopper 24, the underneath carton resting on the longitudinal supporting members is pulled from under the pile by the lower conveyer belt by means of the conveyer bar 37 until it reaches a position with relation to the spacing bars 40 on the upper locking belt when the carton is in open position, when the upper locking belt and the lower conveying belt stop; this stopping is caused by the operation of clutch 14 by means of the dog operated by cam shaft 15. The cam shaft continuing to operate then operates first the depressor 42 into extreme down position, as shown in Fig. 2, depressing the extension of the minor side down and holding it, the carton being shown in dot as well as the cut. This cam shaft 15 then operates elevator 43 into extreme up position, thereby separating the extension on the minor side which is held down, and the extension on the major side, which is pushed up, thus forming an opening between the two extensions from the major sides. Into this extension then is forced opener 44 which is provided with a spear-head 45. This opener is operated by the cam shaft 15 upon the further revolution thereof. During the extreme inward movement of opener 44 exterior squaring member 46 forces the minor side of the carton up carrying with it its attached major side. As soon as the member 46 begins to operate opener 44 is withdrawn to be out of the way. Upon the squaring of the carton to final position it is shoved under locking dog 41 on upper locking belt 1 and is locked between spacing bar 40 and the said locking dog. This requires one revolution of cam shaft 15, upon the completion of which revolution the clutch 14 is thrown into action, and the upper locking belt 1 and the lower conveying belt 2 move together with the enclosed squared carton until ready for another revolution of cam shaft 15, when the process is repeated.

Having thus described my invention, what I claim and desire to secure by Letters Patent is:

1. An automatic carton opener comprising a carrying belt and a locking belt operating in relative timed relation, means for feeding a carton to be opened between said two belts, a depressing element working in timed relation with an elevating element on said carton so fed tending to open opposite sides of said carton, an opener operating within said carton to maintain opposite sides separated, means to square said carton between said belts consisting of an exterior squaring device raising up a wall of said carton to square position with reference to its adjacent wall, and means for locking said squared carton in a fixed relative position between said two belts.

2. A carton feeding machine consisting of, means for conveying a horizontal stack of cartons on edge to a vertical stack of cartons laying flat, and a timed delivery element to deliver cartons onto the vertical stack from the horizontal stack to maintain a predetermined number thereon controlled by the predetermined number of cartons required in the vertical stack.

3. The process of opening a carton provided with major and minor side walls and extensions thereto, consisting of depressing a major side wall extension, raising the other major side wall extension adjacent thereto whereby the carton is slightly opened, then maintaining one of the major side walls positively depressed and said carton slightly open from within freeing said extensions, and then externally pressing the carton into open and squared condition.

CHARLES H. WILD.